C. G. PARSCHAUER.
WEEDER.
APPLICATION FILED DEC. 30, 1919.
1,384,631. Patented July 12, 1921.
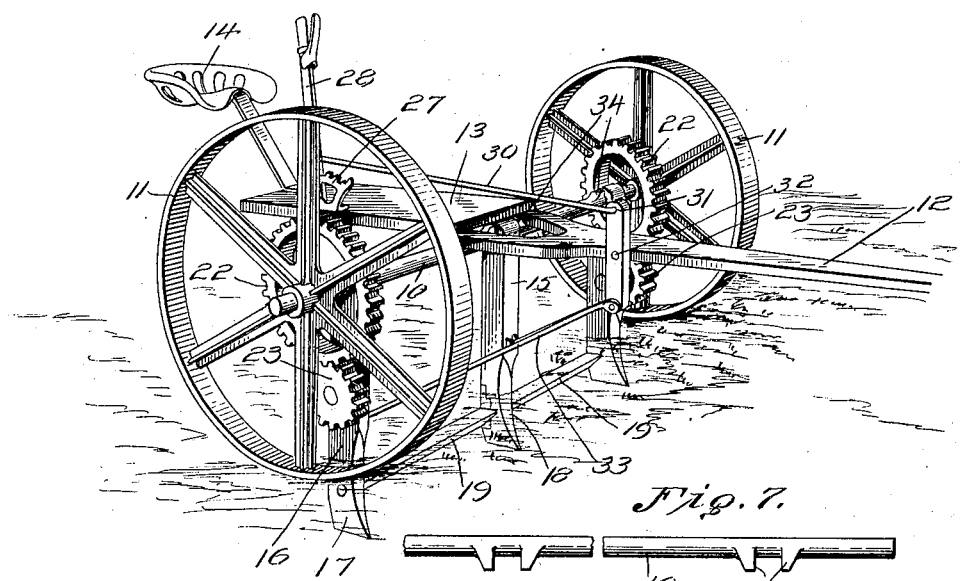
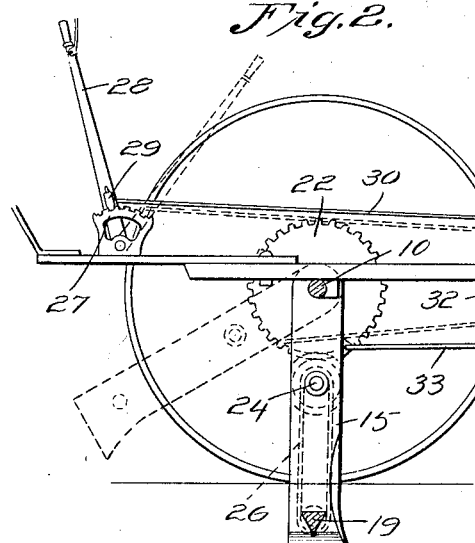
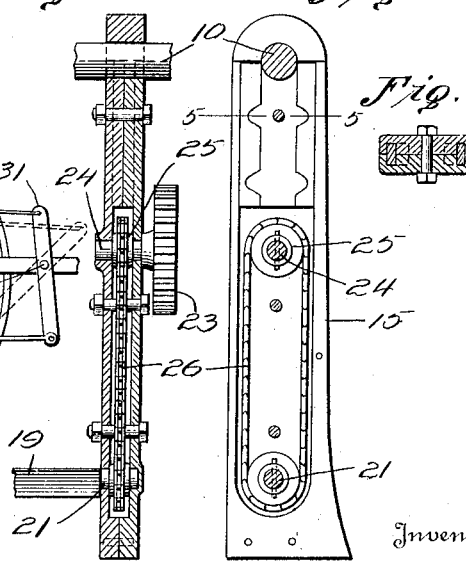
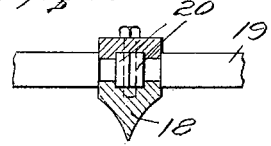
Inventor
Carl G. Parschauer.
By Geo. F. Kimmel
Attorney

UNITED STATES PATENT OFFICE.

CARL GUSTAV PARSCHAUER, OF BEEHIVE, MONTANA.

WEEDER.

1,384,631.  Specification of Letters Patent.  Patented July 12, 1921.

Application filed December 30, 1919. Serial No. 348,318.

*To all whom it may concern:*

Be it known that I, CARL GUSTAV PARSCHAUER, a citizen of Germany, residing at Beehive, in the county of Stillwater and State of Montana, have invented certain new and useful Improvements in Weeders, of which the following is a specification.

The invention relates to a farming implement and more particularly to the class of rotary rod weeders.

The primary object of the invention is the provision of a weeder of this character, wherein the weeding implements are of novel form so as to penetrate the ground to uproot weeds thereby preventing the same from growth and also clearing the ground thereof, thus eliminating the necessity of manual labor for pulling the weeds from the ground and particularly the larger weeds or the like.

Another object of the invention is the provision of a weeder of this character wherein the weeding members are supported for adjustment so that the same can be moved into working relation to the ground or elevated therefrom and will serve to uproot the weeds to destroy the further growth thereof and thus free the ground of the same.

A further object of the invention is the provision of a weeder of this character wherein the cutting bar is of novel form and operated by power transmitted from the traction or ground wheels of the implement, the bar being dragged and rotated through the subsoil beneath the surface of the ground for the uplifting or cutting of the roots of the weeds when the implement is advanced over the ground.

A still further object of the invention is the provision of a weeder of this character which is comparatively simple in construction, thoroughly reliable and efficient in the operation and inexpensive to manufacture.

With these and other objects in view the invention consists in the features of construction, combination and arrangement of parts as will be hereinafter fully described, illustrated in the accompanying drawing and pointed out in the claims hereunto appended.

In the accompanying drawing:

Figure 1 is a perspective view of a weeder constructed in accordance with the invention and showing the weeding members in position for weeding purposes.

Fig. 2 is a fragmentary vertical sectional view through the implement.

Fig. 3 is an enlarged vertical sectional view through one of the hangers of the weeding mechanism.

Fig. 4 is a vertical transverse sectional view through the part shown in Fig. 3.

Fig. 5 is a sectional view on the line 5—5 of Fig. 4.

Fig. 6 is a horizontal sectional view through one of the hangers showing fragmentary adjacent ends of the weeding bar.

Fig. 7 is a fragmentary plan view of the main axle of the implement.

Similar reference characters indicate corresponding parts throughout the several views in the drawing.

Referring to the drawing in detail, the weeding implement comprises a main stationary axle 10 on the end portions of which are journaled the traction or ground wheels 11 and suitably connected medially to said axle is the draft beam or pole 12 to which is adapted to be connected draft animals for the advancement of the implement. Fixed to the rear end of the pole or tongue 12 is a base or platform 13 on which is carried a driver's seat 14 to be occupied by the operator of the implement.

Swingingly connected with the axle 10 are intermediate and outer hangers 15 and 16 respectively, the outer hangers being formed in two sections detachably bolted or otherwise fastened together and are so constructed to form housings for concealment of the operating mechanism hereinafter fully described.

The hangers 15 and 16 are formed with lower knife ends 17 having the concaved forward edges 18 and these ends 17 are adapted to penetrate the ground, while the edges 18 cut or split the soil on the advancement of the implement.

Journaled in the hangers 15 and 16 contiguous to the ends 17 are the two parts 19 of a weeding bar, these parts being formed with the meeting trunnion ends 20 journaled in the hanger 15, while the outer journaled ends 21 of said parts are rotatably engaged in the hangers 16, the parts 19 of the weeding bar being of substantially triangular shape in cross section and are adapted for rotation. Fixed to the hubs of the wheels 11 at the inner side thereof are gears 22 which mesh with pinions 23 fixed to companion stud axles 24 journaled transversely in the hangers 16 and upon these stud axles 24 and journaled ends 21 interiorly of the hangers 16 are sprocket wheels 25 having trained thereover sprocket chains 26 so that motion imparted to the pinions 23 will be transmitted directly to the parts 19 of the weeding bar for its rotation during the advancement of the implement, the power being derived from the traction or ground wheels 11 during such advancement of said implement. The rotation of the parts 19 of the weeding bar which is active in the subsoil below the ground surface is effective for the uprooting of weeds when the implement is advanced.

Fixed upon the platform 13 is a rack segment 27 having pivoted thereto a throw lever 28 provided with the usual hand releasable spring held dog 29 to lock the lever in adjusted position and connected to this lever is a shift rod 30, the same being also pivotally connected to a rocking arm 31 swingingly mounted at 32 upon the pole beam 12 forwardly of the main axle 10, the rocking arm 31 being also pivotally connected to a series of link rods 33 which are pivoted to the respective hangers 15 and 16 so that on adjustment of the throw lever 28 the said hangers can be shifted from operative to inoperative position and vice versa, the operative position of the hangers being shown by full lines in Figs. 1 and 2 of the drawing and in inoperative position by dotted lines in said Fig. 2 of the drawing.

The main axle 10 has formed thereon abutments 34 which coact with the ends of the hangers 15 and 16 connected with said axle so as to prevent lateral displacement of said hangers or the movement thereof longitudinally upon the axle as will be clearly apparent. By reason of the arrangement of the two parts 19 of the weeding bar it will be apparent that the implement can readily turn at a corner or in a curve in its directed course as one rod will operate independently of the other from its companion traction or ground wheel 11 during the turning of the implement as will be clearly obvious.

From the foregoing it is thought that the construction and operation of the implement will be clearly understood and therefore a more extended explanation has been omitted.

What is claimed is:

1. In a rotary rod weeder of the class described comprising a main axle, ground wheels journaled on the ends of said axle, draft means connected with the axle, intermediate and outer hangers depending from the axle and having ground cutting means at their lower ends, a sectional weeding bar journaled in the lower portion of said hangers, and mechanism housed within each outer hanger and operated from the ground wheels for transmitting power to each section of the weeding bar independent of the adjacent section.

2. In a rotary rod weeder of the class described, a main axle, ground wheels journaled on said axle, draft means connected with the axle, a plurality of hangers depending from the axle, and provided with horizontal cutting edges at their lower ends, a sectional weeding bar triangular in cross section journaled in said hangers and above the cutting edges, gearing fixed to the ground wheels, and driven mechanism inclosed within the housing and operated from said gears for transmitting power to each section of weeding bar independent of the adjacent section.

3. In a rotary rod weeder of the class described, a stationary main axle, ground wheels journaled thereon, draft means connected with said axle, vertical hangers pivoted to and depending from said axle, each of said hangers being provided with ground cutting means on its front and lower edges, a sectional, triangular bar rotatably mounted in the lower portion of said hangers, driven mechanism inclosed within certain of the hangers for transmitting power to each of said sections independently of each other, gearing coöperating with each of the ground wheels for driving the said mechanism, and means for raising and lowering said sectional bar with respect to the ground.

4. In an implement of the character described, a main axle, wheels journaled on said axle, draft means connected thereto, vertical hangers swingably mounted and depending from said main axle, each of said hangers being provided with ground cutting means on their lower edges, a sectional bar rotatably mounted in said hangers above the cutting means, driven mechanism inclosed within certain of the hangers for transmitting power to each section independently of each other, gearing coöperating with the ground wheels for driving said mechanism, and means for simultaneously adjusting said hangers and rotary bar with respect to the ground.

In testimony whereof I affix my signature hereto.

CARL GUSTAV PARSCHAUER.